US006174550B1

(12) United States Patent
Fletcher et al.

(10) Patent No.: US 6,174,550 B1
(45) Date of Patent: *Jan. 16, 2001

(54) ANTIFREEZE POLYPEPTIDE-EXPRESSING MICROORGANISMS USEFUL IN FERMENTATION AND FROZEN STORAGE OF FOODS

(75) Inventors: Garth L. Fletcher, St. John's; Choy L. Hew, Thornhill; Shashikant B. Joshi, Toronto; Yaling Wu, St. John's, all of (CA)

(73) Assignees: Seabright Corporation Limited, Newfoundland; HSC Research and Development Limited Partnership, Toronto, both of (CA)

( * ) Notice: Under 35 U.S.C. 154(b), the term of this patent shall be extended for 0 days.

This patent is subject to a terminal disclaimer.

(21) Appl. No.: 08/949,229

(22) Filed: Oct. 13, 1997

Related U.S. Application Data

(63) Continuation of application No. 08/321,991, filed on Oct. 12, 1994, now Pat. No. 5,676,985.

(51) Int. Cl.[7] .................................................. A23C 9/12
(52) U.S. Cl. ................................ 426/34; 426/36; 426/42; 426/580; 426/583; 435/41; 435/71.1; 435/252.9; 435/253.4
(58) Field of Search .................................. 426/34, 36, 37, 426/38, 42, 580, 582, 583; 435/41, 71.1, 252.9, 253.4; 530/350

(56) References Cited

U.S. PATENT DOCUMENTS

| | | | |
|---|---|---|---|
| 4,110,476 | * 8/1978 | Rhodes | 426/41 |
| 4,416,305 | * 11/1983 | Lundstedt et al. | 426/34 |
| 4,450,177 | * 5/1984 | Lawson et al. | 426/19 |
| 4,938,973 | * 7/1990 | Klaver et al. | 426/42 |
| 4,970,083 | * 11/1990 | Akahoshi et al. | 426/34 |
| 5,118,792 | 6/1992 | Warren et al. | 530/350 |
| 5,194,269 | 3/1993 | Lee | 426/61 |
| 5,676,985 | * 10/1997 | Fletcher et al. | 426/36 |

FOREIGN PATENT DOCUMENTS

0305071 * 3/1989 (EP).

OTHER PUBLICATIONS

Knight et al., 1984, *Nature* 308:295–296.
Knight et al., 1986, *Cryobiology*, 23:256–262.
Knight et al., 1988, *Cryobiology*, 25:55–60.
Hew et al., 1984, *J. Comp. Physiol. B* 155:81–85.
Li et al., 1985, *J. Biol. Chem.* 260:12904–12909.
Anathanarayanan, 1989, *Life Chem. Rep.* 7:1–32.
Davies et al., 1990, *FASEB Journal* 4:2460–2467.
Fletcher et al., 1988, *Can. J. Fish. Aquat. Sci.* 45:352–357.
Kenward et al., 1993, *Plant Mol.Biol.* 23:377–385.
Li et al., 1991, *Protein Engineering* 4:995–1002.
Li et al., 1991, *Protein Engineering* 4:1003–1008.
Sönnichsen et al., 1993, *Science* 259:1154–1157.
Rancourt et al., 1987, *Mol. Cell. Biol.* 7:2188–2195.

* cited by examiner

*Primary Examiner*—Leslie Wong
(74) *Attorney, Agent, or Firm*—Townsend and Townsend and Crew LLP

(57) ABSTRACT

Methods and compositions for preparation of frozen fermented food products using antifreeze polypeptide-expressing microorganisms are provided. In particular the invention provides for use of fish antifreeze polypeptide-expressing microorganisms in fermentation of milk to produce and store frozen yogurt.

26 Claims, No Drawings

ANTIFREEZE POLYPEPTIDE-EXPRESSING MICROORGANISMS USEFUL IN FERMENTATION AND FROZEN STORAGE OF FOODS

This is a continuation of application Ser. No. 08/321,991, filed Oct. 12, 1994, now U.S. Pat. No. 5,676,985 the disclosure of which is incorporated by reference.

FIELD OF THE INVENTION

The present invention relates generally to methods and reagents useful in maintaining the quality of frozen food products during frozen storage, particularly enhanced storage life and the maintenance of consumer accepted quality of dairy products.

BACKGROUND OF THE INVENTION

Refrigeration, particularly freezing, is a common and preferred means for storing biological materials. Frozen storage generally arrests or considerably slows the deterioration of the biological product.

Frozen or refrigerated foods are now a mainstay of the human diet in developed nations. Thus extensive research has and is being carried out by food scientists to ensure high quality products for the consumers. This is particularly true with regard to frozen vegetables and frozen deserts such as ice cream and yogurt.

Frozen deserts such as ice cream or yogurt are generally eaten in the frozen state. Thus, the texture of the frozen product as well as its flavor is important to consumers. Texture is to a large extent governed by the size of the ice crystals. Producers of these frozen deserts have gone to considerable effort and expense to ensure smooth textured products. However, during frozen storage the ice crystals can grow and thus roughen and spoil this texture. The growth of ice crystals during frozen storage is known as recrystallization. This problem is particularly common when the frozen storage conditions are less than ideal, such as during transportation or storage in modern frost-free home freezers. After a relatively short period of time at above-zero temperatures (i.e., above 0° C.), or even at sustained freezing temperatures, frozen foods can become less desirable or even unsuitable for human consumption due to the ice recrystallization process.

Although manufacturers use a variety of techniques to reduce the damage associated with recrystallization success has been limited and significant problems remain. Thus there is a need for new techniques to reduce or prevent the recrystallization process and improve the characteristics of frozen foods. These techniques and compositions should be inexpensive and completely safe and suitable for human consumption.

It has been clearly demonstrated that antifreeze polypeptides (AFP) can effectively inhibit ice recrystallization at low ($\mu$g/ml) concentrations in aqueous solutions and frozen food products (see, e.g., Knight et al., 1984, *Nature* 308:295–296; Knight et al., 1986, *Cryobiology*, 23:256–262; Knight et al., 1988, *Cryobiology*, 25:55–60; Warren et al., U.S. Pat. No. 5,118,792). Warren et al, supra, have suggested adding purified antifreeze polypeptides directly to food products prior to freezing to improve preservation characteristics during frozen storage.

At the present time antifreeze proteins are available for commercial use from two sources; the blood serum from a small number of fish species found in cold water, and recombinant DNA techniques such as those described by (but not restricted to) Warren et al., supra. Other sources of antifreeze proteins, such as transgenic plants and animals, are currently being explored. Regardless of the source, the antifreeze polypeptides must be isolated from the medium in which they are found or produced, and subject to extensive purification. These purification procedures are expensive to the point where the cost of the antifreeze polypeptide additions could exceed the value of the frozen product. Moreover, the purification protocol may introduce contaminants unsafe for consumption.

In the view of the inherent value to producers and consumers of inhibiting ice recrystallization in frozen fermented dairy products, and the fact that antifreeze polypeptides are very effective in this regard, it is desirable to develop methods to incorporate the antifreeze polypeptides into the food products in the most efficient and cost effective method possible.

An ideal method of incorporating antifreeze polypeptides into frozen fermented food products is to have the organism responsible for the fermentation process produce the antifreeze proteins while fermenting the food. A number of antifreeze polypeptides and their genes have been well characterized and sequenced (see, e.g. Anathanarayanan, 1989, *Life Chem. Rep.* 7:1–32 and Davies et al., 1990, *FASEB Journal* 4:2460–2467). Several of these genes have been expressed in bacteria, transgenic plants, fish and Drosophila (see, e.g., Fletcher et al., 1988, *Can. J. Fish. Aquat. Sci.* 45:352– 357; Rancourt et al., 1987, *Mol. Cell. Biol.* 7:2188–2195; Kenward et al., 1993, *Plant Mol.Biol.* 23:377–385; Li et al., 1991, *Protein Engineering* 4:995–1012; and Sönnichsen et al., 1993, *Science* 259:1154–1157).

In view of the widespread popularity of frozen fermented dairy products such as yogurt it would be desirable to develop methods for producing such products more efficiently at lower cost and with better flavor and texture. The present invention provides methods for achieving this goal.

SUMMARY OF THE INVENTION

The present invention provides methods for preparing a frozen fermented food product. This method comprises the steps of (a) contacting a food product with a microorganism that is capable of secreting a fish antifreeze polypeptide, wherein the microorganism is capable of fermenting the food product to produce the fermented food product, (b) incubating the food product with the microorganism under conditions in which fermentation takes place so that a fermented food product is produced having the antifreeze polypeptide present in an amount effective at inhibiting recrystallization of the product; and (c) freezing the fermented food product at a temperature below −5° C., so as to produce a frozen fermented food product.

In one embodiment the food product is a dairy product (e.g., milk) which can be fermented to produce yogurt, buttermilk or cheese.

The microorganism of the invention is usually a bacterium (e.g., *Lactobacillus bulgaricus; Streptococcus cremoris, Streptococcus lactis; Bifidobacterium bifidum, Bifidobacterium longum*) but may also be a fungus such as a yeast (e.g., *Saccharomyces fragilis, Saccharomyces cerevisiae, Saccharomyces lactis,* and others). According to the invention these microorganisms are genetically engineered so that they are capable of secreting a fish antifreeze polypeptide (or a peptide with substantial sequence similarity to a fish antifreeze polypeptide and with antifreeze properties similar to a fish antifreeze polypeptide). In a preferred embodiment, the antifreeze polypeptide is an animal antifreeze polypeptide, with a fish antifreeze polypeptide preferred. Most preferred is microorganism capable of expressing an ocean pout type III antifreeze polypeptide (see, e.g., Hew et al., 1984, *J. Comp. Physiol. B*155:81–85; Li et al., 1985, *J. Biol. Chem.* 260:12904–12909).

In a most preferred embodiment the invention comprises incubating milk with bacterial species *Lactobacillus balgaricus* and *Streptococcus lactis* that are capable of fermenting milk to produce yogurt and capable of secreting an ocean pout type III antifreeze polypeptide; incubating the bacteria and milk under conditions that produce yogurt; and freezing the yogurt at a temperature below −5° C., so as to produce frozen yogurt.

The invention also provides a composition comprising yogurt and a microorganism wherein the microorganism comprises a gene encoding a fish antifreeze polypeptide.

DETAILED DESCRIPTION

Definitions

As used herein, "fermentation" refers to the chemical conversion of carbohydrates or proteins in foods through the use of microorganisms. In this process carbohydrates are often converted to lactic acid.

As used herein, "food product" refers to a foodstuff (a substance that can be used, or prepared for use, as food) that can be transformed by the action of a fermenting microorganism to a fermented food product.

As used herein "fermented food product" refers to an edible food prepared by a process that includes fermentation by a microorganism.

As used herein "yogurt" refers to a dairy product produced by the lactic acid fermentation of milk by the action of microorganisms.

As used herein "Antifreeze polypeptides" (AFPs) refers to macromolecules found in the body fluids of some animals and plants, which have the commonly known property that they reduce non-colligatively the freezing point of water. Antifreeze polypeptides are also known as "thermal hysteresis proteins." As used herein, "antifreeze polypeptides" includes glycoproteins as well as chemically synthesized, and recombinantly produced polypeptides having a protein sequence with substantial similarity to a naturally occurring APP and retaining the properties of an antifreeze polypeptide.

As used herein "fish antifreeze polypeptide" refers to an AFP that is found in nature in a fish, as well as chemically synthesized and recombinantly produced polypeptides having a protein sequence with substantial similarity to a naturally occurring fish AFP and retaining the properties of a antifreeze polypeptides.

As used herein, "recombinantly produced polypeptides" refers to a polypeptide produced using recombinant DNA techniques. Recombinant DNA techniques are well known and are characterized by the joining of at least two segments of DNA that are not naturally joined in nature (e.g., a bacterial promoter and a fish polypeptide coding sequence).

As used herein, "substantial similarity" denotes a characteristic of a polypeptide sequence or nucleic acid sequence, wherein the polypeptide sequence has at least 70 percent sequence identity, preferably 80 percent sequence identity, and most preferably 90% sequence identity compared to a reference sequence (e.g., a naturally occurring antifreeze polypeptide), and the nucleic acid sequence has at least 80 percent sequence identity and preferably 90% sequence identity compared to a reference sequence. The reference sequence may be shorter than the full-length naturally occurring polypeptide or nucleic acid sequence but will be at least 12 residues long for the case of a polypeptide and at least 36 bases long for the case of a nucleic acid.

Description

The present invention provides methods for preparing a frozen fermented food product by adding a microorganism that is capable of fermenting the food product to produce the fermented food product and also is able to secrete a fish antifreeze polypeptide. The use of a microorganism that both secretes an AFP and ferments the food product has several advantages over other methods for affecting ice crystal formation and freezing temperature. For example, the claimed method avoids the costly necessity for purifying an AFP prior to addition to a food product. In addition, this will eliminate any possible contamination from the purification protocol and the pyrogenicity associated with foreign microorganisms. Furthermore, because the AFP is secreted by the fermenting microorganism of the claimed invention, this process requires fewer steps than other methods.

The food product of the invention is usually milk but other foods that are fermented to produce an edible fermented food may also be used. Examples include cabbage (which can be fermented to produce sauerlraut), cucumbers (which can be fermented to produce pickles) and soybeans (which can be fermented to produce miso and other products).

In one step of the claimed method, the food product is contacted or mixed with a microorganism capable of fermenting the food product. Examples of microorganisms useful in food fermentation are well known (see, e.g., van de Guchte, 1992, *FEMS Microbiology Reviews*, 88:73–92).

In a preferred embodiment the food product is milk (e.g., from a cow [i.e. bovine], ewe, mare, or goat). The action of fermenting microorganisms, typically bacteria, on the milk produces yogurt, buttermilk, or certain cheeses, according to the choice of the bacteria and the conditions of incubation. In a most preferred embodiment the method of the invention will be used to produce yogurt from milk. Yogurt is referred to by a variety of names around the world. Table 1 provides a list of the names and country of origin of the common varieties.

Methods for yogurt production can be found in *Functions of Fermented Milk* edited by Nakazawa and Hosono, 1992, published by Elsevier Applied Science, London-New York, p. 32, which is incorporated herein by reference. In the United States yogurt is produced from either whole or skim milk from cows. The milk is standardized to 10.5 to 11.5% solids, heated to above 90° C. (30 to 60 minutes) to destroy any contaminating microorganisms, and then cooled. The material is then inoculated with a mixed culture of *Streptococcus thermophilus* and *Lactobacillus bulgaricus* in a 1:1 ratio. The combined action of these two organisms is usually needed to obtain the desired flavor and acid in the products. In other instances, other high fermenting bacteria including bulgarian bacteria, *L. jugarti, L. acidophilus, Bifido bacterium,* spp. Yeast and lactic fungi have also been used. Examples of bacteria and other organisms used for the fermentation of milk to produce yogurt are given in Table 2.

According to the invention, the microorganisms will be genetically engineered (i.e., employing the techniques of recombinant DNA technology) so that they are able to secrete a fish antifreeze polypeptide. Examples of fish antifreeze polypeptides include type I AFP of winter flounder; type II AFP of sea raven, herring and smelt; type III AFP of ocean pout and wolffish, and AFGP (antifreeze glycoprotein) of cods and notothenlids (see, e.g. Davies et al., 1990 *FASEB Journal* 4:2460–2467, and Ewart et al., 1992, *Biochem. Biophys. Res. Comm.* 185:335–340).

Most preferred is microorganism capable of expressing an ocean pout type III antifreeze polypeptide. The ocean pout type III antifreeze polypeptide is preferred because it has no amino acid bias and has been shown to be active when expressed in *E. coli* (Li et al., 1991, *Protein Engineering* 4:995–1012; Sönnichsen et al., 1993, *Science,* 259:1154–1157). In addition, the type III AFP is preferred because type I AFP of winter flounder may not be stable at the fermentation temperature and type II AFP may not be correctly folded in bacterial system and is very susceptible to reduction.

The methods for engineering bacteria and fungi capable of expressing and secreting a heterologous polypeptide are well established (see, e.g., Maniatis et al. (1982), *Molecular Cloning, A Laboratory Manual,* Cold Spring Harbor Press, Cold Spring Harbor, New York; Berger and Kimmel, *Guide to Molecular Cloning Techniques, Methods in Enzymology* 152 (Academic Press, Inc., San Diego, Calif.); Simon et al., 1986, *Appl. Environ. Microbiol.* 52:394–395; and von Wright et al., 1985, *Appl. Environ. Microbiol.* 50:1100–1102, all of which are incorporated herein by reference)

The production of microorganisms capable of expressing and secreting an AFP can be carried out in a variety of ways that will be apparent to one of ordinary skill. The DNA sequence encoding the AFP will preferably be operably linked (i.e., positioned to ensure the functioning of) to an operon which allows the DNA to be transcribed (into an RNA transcript) and translated into a polypeptide in the microorganism. Promoters for both bacteria and fungi are well known in the art. Preferred operons for expression in lactic acid bacteria include the lactose operon of *S. thermophilus* or lac ABCDFEGX operon of *L. lactic* because they have been used successfully to drive foreign gene expression in the hosts (see, e.g., Simons et al., 1993, *J. Bact.* 175:5186–5175; Mollet et al., 1993, *J. Bact.* 175:4315–4324).

The AFP may be expressed as a fusion polypeptide for increased stability or other beneficial properties. Furthermore the AFP polypeptide may be modified via a modification of the gene encoding the polypeptide. In general, modifications of the genes may be readily accomplished by a variety of well-known techniques, such as site-directed mutagenesis (see, e.g., Gillman and Smith, 1979, *Gene* 8:81–97 and Roberts et al., 1987, *Nature* 328:731–734).

The microorganisms of the invention are capable of secreting the AFP. Accordingly, the AFP will preferably be linked to a signal peptide sequence. Examples of suitable signal peptide sequences include those from the usp45 gene of *L. lactis* ssp *lactis* MG 1363 and the *L. lactis* ssp cremoris SK 11 cell envelop associated protease gene (van Asseldonk et al., 1990, *Gene* 95:155–160; De vos et al., 1989, *J. Dairy Sci.* 72:3398–3405). For bacteria such as *L. lactis* the usp45 signal peptide is preferred since it derives from the same host. In one preferred embodiment the AFP gene is linked to a transcription termination sequence to ensure correct termination of AFP transcription in the host system.

An AFP gene construct including elements described above is constructed using plasmids such as pUC19, pNZ18 and pDBN183 as vectors (Solaiman et al., 1992, *Plasmid,* 28:25–36). The AFP gene construct is incorporated into the genome of a lactic acid bacterial species using homologous recombination techniques (Mollet et al., 1993, *J. Bact.,* 175:4315–4324). The lactic acid bacteria and *E. coli* strains can be maintained as recommended by Maniatis et al. in *Molecular Cloning, A Laboratory Manual,* supra; and Chagnand et al., 1992, *Can. J. Microbiol.* 38:67–74.

Fish antifreeze-expressing (FAE) microorganisms may be applied to food products in any conventional way. In the case of products such as milk, the bacteria or fungus can be mixed intimately with the foodstuff that is to be fermented and frozen. It will be known by those of skill that mixtures of different microorganisms are sometimes used to produce the desired product. For example, in preparation of yogurt, *S. thermophilus* and *L. bulgaricus* are often used together.

The number of FAE microorganisms added to the food product will depend on the properties of the microorganisms and of the food. Generally, lactic acid FAE starter bacteria ($10^{10}$–$10^{11}$ per ml) are incubated at 1–5% into pasteurized and cooled milk such that the proportion results in an appropriate amount of antifreeze polypeptide in the product. The amount of AFP in the product should be an amount effective at preventing or inhibiting ice recrystallization (1–100 mg/liter milk). This can be determined using the splat-cooling assay described by Knight et al. (1988) *Cryobiology,* vol. 25, pp. 55–60.

In another step of the method, the fermented food product is frozen using conventional freezer operations, such as blast freezers (−20° to 40° C.) or contact plate freezers (−30° to 40° C.) or vacuum freeze driers. It will be apparent to one of ordinary skill that numerous variations of the aforementioned embodiments are possible.

TABLE 1

Names used to describe types of yogurt

| Product Name | Country of Origin |
| --- | --- |
| Jugurt/Eyran/Ayran | Turkey, etc. |
| Busa | Turkestan |
| Kissel Mleka | Balkans |
| Urgotnic | Balkan Mountains |
| Leban/Laban | Lebanon/Arab countries |
| Zabady (Zabbady) | Egypt/Sudan |
| Mast/Dough | Iran/Afghanistan |
| Roba | Iraq |
| Dahi/Dadhi/Dahee | India |
| Mazun/Matzoon/Matsun/Matsoni | Armenia |
| Katyk | Transcaucasia |
| Tiaourti | Greece |
| Cieddu | Italy |
| Mezzoradu | Sicily |
| Gioddu | Sardinia |
| Biokys | Czechoslovakia |
| Karmdinka | Poland |
| Tarho | Hungary |
| Tykmaelk/Ymer | Hungary |
| Villi (Fiili) | Finland |
| Filmjolk/Fillbunke/Surmelk/Taettemjolk/Tettemelk | Scandinavia |
| Iogurte | Brazil/Portugal |
| Proghurt | Chile |
| Skyr | Iceland |
| Gruzovina | Yugoslavia |
| Kefir/Donskaya/Varentes Kurunga/Koumiss/Ryazhenka/Guslyanka | Soviet Union |
| Tarag | Mongolia |
| Shosim/Sho/Thara | Nepal |

TABLE 2

Microorganisms commonly used in fermented milk and lactic drinks

| Genus | Habit | Fermentation | Main Species |
|---|---|---|---|
| Streptococcus[a] | Coccal chains | Homo | S. cremoris, lacfis, thermophilus |
| Leuconostoc[b] | Coccal pairs | Hetero | L. citrovorum, mesenteroides |
| Lactobacillus[c] | Rods | Homo | L. acidophilus, bulgaricus, casei, jugurti, lactis |
| Bifidobacterium | Rods | Hetero | B. bifidum, breve, longum |

Others:

Yeasts (*Torulopsis holmil; Saccharomyces fragilis, cerevisiae, lactis; Candida pseudotropicalis,* etc.)
Fungi (*Geotrichum candidum*)
Acefic acid bacteria (*Acetobacter acefi, rasens*)

[a]Now *Lactococcus lactis* subsp. *cremoris, Lac, lactis* subsp. *lactis and S. thermophilus*.
[b]Now *L. mesenteroides* subsp. *cremoris and L. mesenteroides* subsp. *mesenteroides*.
[c]Now *L. acidophilus, L. delbrueckii* subsp. *bulgaricus, L. casei* subsp. *casei, L. helveticus biovar. jugurti and L. delbrueckii* subsp. *lactis*.

EXAMPLES

The invention is illustrated by the following examples. These examples are offered by way of illustration, not by way of limitation.

Example 1

Construction of a strain of lactic acid bacteria that produce antifreeze polypeptide—Method I To engineer a lactic acid bacterium that produce antifreeze proteins several steps are involved. The first step is selection and preparation of a chromosomal site for the AFP gene integration. A native operon of a strain of lactic acid bacteria such as the lactose operon of the *S. thermophilus* or *L. lactis* genome, consisting of the lacS (lactose permease) and lacZ (β-galactosidase) genes, is used for the integration of an antifreeze protein gene. Integration of an AFP gene into such an operon should preserve its correct function. The AFP gene should become a functional part of the operon and be regulated similarly (see, e.g., Simons et al., 1993, *J. Bact.*, 175:5186–5175, and Mollet et al., 1993, *J. Bact.* 175:4315–4324).

To do this, the lacS and lacZ genes from the host bacteria are cloned by PCR procedures or conventional gene cloning methods. At least one restriction enzyme site is generated between the two genes by designing particular primer sequences for the PCR reactions. The restriction enzyme sites are generated for convenient segment linkage and insertion of DNA fragment. An antibiotic resistance marker gene such as an ampicillin or erythromycin resistance gene is inserted into the generated restriction enzyme site. The lacS-Amp™-lacZ DNA in an appropriate vector such as pNZ932 is transformed into the lactic acid bacterial strain (see, e.g. Simons et al., 1993, *J. Bact.* 175:5186–5175). Ampicillin-resistant transformants will be selected, and gene integration will be verified using PCR and DNA sequencing.

The second step involves construction of an antifreeze protein gene cassette. Using the nucleotide sequence derived from a cloned ocean pout type III AFF gene, an appropriate type III AFP gene is assembled from synthetic oligonucleotides using the preferential codons of the host (see, e.g., Mercenier, 1990, *FEMS Microbiology Reviews,* 87:61–78, and van Asseldonk et al., 1992, *FEMS Microbiology Reviews* 88:73–92). To make a bacteria secrete AFP, a signal peptide sequence (SP) from homologous genes such as the usp45 gene of *L. lactis* ssp *lactis* MG 1363 and the *L. lactis* ssp *cremoris* SK11 cell envelop-associated protease genes is fused to the 5'-end of the type III mature AFP coding sequence (van Asseldonk et al., 1990, *Gene* 95:155–160, and De vos et al., 1989, *J. Dairy Sci.* 72:3398–3405). The AFP gene cassette, including a signal peptide sequence and an AFP gene will be inserted between the lacS and lacZ genes in vitro to generate a lacS-SP-AFP-lacZ construct.

Finally, the lacS-SP-AFP-lacZ DNA is incoporated into the genome of the ampicillin-resistant bacteria generated from step one by homologous recombination techniques. Gene replacement of lacS-Amp™-lacZ by lacS-SP-AFP-lacZ is initially selected by their ability to grow on medium in the presence or absence of ampicillin. AFP gene integration is confirmed by inverse PCR, Southern blot analysis and DNA sequencing.

Example 2

Construction of a strain of lactic acid bacteria that produces antifreeze polypeptide—Method II An alternative method to generate an antifreeze protein-producing lactic acid bacterium is to eliminate the step of integrating an antibiotic resistance gene construct into the genome of the bacterium. In this case, experiments will be carried out as described in steps 2 and 3 in Example 1. A labelled AFP gene fragment will be used to identify recombinant clones, and AFP gene integration will be further confirmed by inverse PCR and DNA sequencing.

Example 3

Use of antifreeze polypeptide expressing bacteria in yogurt production

The genetically engineered bacterium can be directly used to prepare starters for making frozen yogurt. In brief, a small quantity of the genetically engineered stock culture (frozen or cold stored culture) is cultured in 0.5–1 liter of pasteurized skim milk to prepare a mother culture. Intermediate fermentation is then carried out to scale up 10–100 times by stages from the mother culture to the bulk starter which can be added directly to pretreated milk. Alteratively, bulk starter can be prepare directly from frozen stocks. The milk mixture is prewarmed to 55–60° C. and then homogenized (150–200 Kg/cm$^2$) and pasteurized (90–95° C. for 5–10 minutes or 120–130° C. for a few seconds), and cooled to a temperature range within which the lactic acid bacteria will not be damaged (45–48° C.). The starter bacteria are applied to inoculate with pretreated homogenized milk at 30–45° C. When the acidity reaches a certain prescribed level such as 0.8% and the amount of AFP in the product reaches required concentration (1–100 mg/liter milk), the fermented milk is cooled to 15–20° C. to suppress bacterial activity. These products are used to make soft frozen yogurt, hard frozen yogurt, and mousse yogurt by adding different percentages of fruit syrup, sugar, stabilizers, fruit juice and emulsifiers to a cold fermented milk base.

Example 4

Production of frozen yogurt

Soft frozen yogurt is made by adding 20% fruit syrup and stabilizers and emulsifiers to 80% of a cold fermented milk base, and then filling into containers with a. 50–60% overrun using a normal ice cream freezer. The product is stored at 0–6° C.

Hard frozen yogurt is made of 35% fruit juice, the overrun is 70–80%, and storage temperature is below −25° C.

Mousse yogurt is made by mixing a fermented milk base with a warm mousse base (a homogenized mixture of skim milk, sugar, stabilizers and emulsifiers). The product is stored at below 0° C.

The above examples are provided to illustrate the invention but not to limit its scope. Other variants of the invention will be readily apparent to one of ordinary skill in the art and are encompassed by the appended claims. All publications, patents, and patent applications cited herein are hereby incorporated by reference.

What is claimed is:

1. A method for preparing a frozen fermented food product comprising the steps of:
   a) contacting a food product with a microorganism that secretes an antifreeze polypeptide into the food product and that ferments the food product;
   b) incubating the food product with the microorganism under conditions in which fermentation takes place so that a fermented food product is produced having the antifreeze polypeptide present in an amount effective at preventing or inhibiting ice-crystal formation in the food product during storage; and, then
   c) freezing the fermented food product at a temperature below −5° C. so as to produce a frozen fermented food product.

2. The method of claim 1 wherein the food product is a dairy product.

3. The method of claim 2 wherein the food product is bovine milk.

4. The method of claim 3 wherein the fermented food product is yogurt.

5. The method of claim 3 wherein the fermented food product is selected from the group consisting of buttermilk and cheese.

6. The method of claim 1 wherein the microorganism is a bacterium.

7. The method of claim 6 wherein the bacterium is selected from the group consisting of *Streptococcus cremoris, Streptococcus lactis, Streptococcus thermophilus, Leuconostoc citrovorum, Leuconostoc mesenteroides, Lactobacillus acidophilus, Lactobacillus bulgaricus, Lactobacillus casei, Lactobacillus jugurti, Lactobacillus lactis, Bifidobacterium bifidum, Bifidobacterium breve,* and *Bifidobacterium longum.*

8. The method of claim 1 wherein the microorganism is a fungus.

9. The method of claim 8 wherein the fungus is a yeast.

10. The method of claim 9 wherein the yeast is selected from the group comprising *Torulopsis holmil, Saccharomycesfragilis, Saccharomyces cerevisiae, Saccharomyces lactis,* and *Candida pseudotropicalis.*

11. A method for preparing frozen yogurt comprising the steps of:
   (a) contacting milk with a microorganism that secretes an antifreeze polypeptide into the milk and that ferments the milk;
   (b) incubating the milk with the microorganism under conditions in which fermentation takes place so that yogurt is produced having the antifreeze polypeptide present in an amount effective at preventing or inhibiting ice-crystal formation in the yogurt during storage; and, then
   (c) freezing the yogurt at a temperature below −5° C. so as to produce frozen yogurt.

12. The method of claim 11 wherein the microorganism is a member selected from the group consisting of *Streptococcus cremoris, Streptococcus lactis, Streptococcus thermophilus, Leuconostoc citrovorum, Leuconostoc mesenteroides, Lactobacillus acidophilus, Lactobacillus bulgaricus, Lactobacillus casei, Lactobacillus jugurti, Lactobacillus lactis, Bifidobacterium bifidum, Bifidobacterium breve, Bifidobacterium longum, Torulopsis holmil, Saccharomyces fragilis, Saccharomyces cerevisiae, Saccharomyces lactis,* and *Candida pseudotropicalis.*

13. A composition comprising a frozen fermented food product containing a microorganism which ferments said food product and which secretes an antifreeze polypeptide into said food product.

14. The composition of claim 13 wherein the microorganism is a bacterium selected from the group comprising *Streptococcus thermophilus* and *Lactobacillus bulgaricus.*

15. A microorganism host cell transformed with an expression vector comprising a first nucleic acid which encodes a signal peptide sequence operably linked to a second nucleic acid encoding an antifreeze polypeptide.

16. A microorganism host cell of claim 15, wherein said microorganism host cell has a cell membrane and said antifreeze polypeptide is secreted outside said cell membrane.

17. A microorganism host cell of claim 15, wherein said antifreeze polypeptide is secreted into a medium external from said microorganism host cell.

18. A microorganism host cell of claim 15, wherein said microorganism is a bacterium.

19. A microorganism host cell of claim 18, wherein said bacterium is selected from the group consisting of *Streptococcus cremoris, Streptococcus lactis, Streptococcus thermophilus, Leuconostoc citrovorum, Leuconostoc mesenteroides, Lactobacillus acidophilus, Lactobacillus bulgaricus, Lactobacillus casei, Lactobacillus jugurti, Lactobacillus lactis, Bifidobacterium bifidum, Bifidobacterium breve,* and *Bifidobacterium longum.*

20. A microorganism host cell of claim 19, wherein the bacterium host cell is selected from the group consisting of *Streptococcus thermophilus* and *Lactobacillus bulgaricus.*

21. A microorganism host cell of claim 15, wherein said microorganism is a fungus.

22. A microorganism host cell of claim 21, wherein said fungus is a yeast.

23. A microorganism of claim 22, wherein said yeast is selected from the group consisting *Torulopsis holmil, Saccharomyces fragilis, Saccharomyces cerevisiae, Saccharomyces lactis* and *Candida pseudotropicalis.*

24. A microorganism host cell of claim 15, wherein said antifreeze polypeptide is substantially similar to a fish antifreeze polypeptide.

25. A microorganism host cell of claim 24, wherein said antifreeze polypeptide is an ocean pout type III antifreeze polypeptide.

26. A microorganism host cell of claim 15, wherein said expression vector comprises a lacS-SP-AFP-LacZ gene construct.

* * * * *